United States Patent [19]

Beneitone

[11] Patent Number: 4,807,689
[45] Date of Patent: Feb. 28, 1989

[54] ROTARY TAKE-OFF SYSTEM AND METHOD OF OPERATING SAME

[75] Inventor: Raymond D. Beneitone, San Manuel, Ariz.

[73] Assignee: Magma Copper Co., San Miguel, Ariz.

[21] Appl. No.: 13,299

[22] Filed: Feb. 10, 1987

[51] Int. Cl.⁴ .................... B22D 5/02; B22D 47/00
[52] U.S. Cl. .................... 164/76.1; 164/128; 164/130; 164/269; 164/270.1; 164/326; 198/466.1; 198/479.1
[58] Field of Search ............ 164/76.1, 130, 269, 164/270.1, 326, 128; 198/466.1, 412, 479.1

[56] References Cited

U.S. PATENT DOCUMENTS

| | | | |
|---|---|---|---|
| 1,960,002 | 5/1934 | Eppensteiner et al. | 164/269 |
| 2,777,178 | 1/1957 | Troglione | 164/128 X |
| 3,057,453 | 10/1962 | McAlpine et al. | 198/466.1 X |
| 3,410,387 | 11/1968 | Wennberg et al. | 198/27 |
| 3,618,657 | 11/1971 | DeBie | 164/269 |
| 3,659,644 | 5/1972 | DeBie | 164/326 |
| 3,741,365 | 6/1973 | McAlpine et al. | 198/27 |
| 3,799,322 | 3/1974 | Van Linder et al. | 198/35 |
| 3,860,123 | 1/1975 | Molochnikov et al. | 214/1 |
| 3,921,705 | 11/1975 | Furuse et al. | 164/269 |
| 4,184,235 | 1/1980 | Ono et al. | 29/33 R |
| 4,299,189 | 11/1981 | Hagberg et al. | 118/675 |

OTHER PUBLICATIONS

McCain, J. D. et al., "New Techniques and New Efficiencies at the San Manuel Smelter" in vol. 2, Conference Proceedings of Metallurgical Society of American Institute of Metallurgical Engineers entitled "Advances in Sulphide Smelting" (1983), pp. 709–725.

Primary Examiner—Nicholas P. Godici
Assistant Examiner—J. Reed Batten, Jr.
Attorney, Agent, or Firm—Pennie & Edmonds

[57] ABSTRACT

A rotary take-off system comprising an apparatus for removing manufactured objects such as cast metal anodes from a first work station and transporting these objects to a second work station. The first station, at which the object is manufactured, may preferably be a mold located upon a rotatable casting wheel, while the second work station is preferably a quenching medium for cooling and temporarily holding the manufactured object. After the object is manufactured at the first work station it is then transported through an arc of approximately 180° by a pair of rotatable arms to the second work station for further processing. The arms are coupled to a motor which is operated in order to cause the rotation thereof. Within the quenching medium, a pair of pivotably connected hydraulic push arms is positioned, which accept the anode as it drops from the rotatable arms and which thereafter facilitate the sliding and stacking of the completed anodes to a rear portion of the quenching medium.

21 Claims, 2 Drawing Sheets

ROTARY TAKE-OFF SYSTEM AND METHOD OF OPERATING SAME

TECHNICAL FIELD

The invention relates to an automated rotary take-off system for removing cast metal anodes from molds located on a rotary casting wheel and subsequently transporting these anodes to a quenching medium.

BACKGROUND OF THE INVENTION

The production of metal anodes by casting them on a rotary casting wheel for subsequent electrolytic refinement is well known in the art. Once the crude molten metal, i.e. copper, nickel, lead, etc. has been cast into a predetermined shape, preferably a rectangular plate having support members or ears protruding outwardly in a perpendicular direction from opposing side edges at an upper edge thereof, the anode is removed from the casting apparatus and transported to the next work station for further processing.

Various methods have been described in the prior art to facilitate the removal of these anodes from a casting apparatus, after which they may be transported to the next stop on the production line. U.S. Pat. No. 4,184,235 to Ono et al. for example, discloses an apparatus for shaping such cast anodes which further includes a device which is moveable vertically and horizontally for initially transferring the anodes into a receptacle for being shaped and then transferring the shaped anodes from the receptacle to facilitate further treatment.

The transfer device is supported above the shaping work station of the apparatus with which it is operatively associated and comprises a carrier portion mounted on rails for lateral movement above the anode shaping device. Two hanging frames, capable of pneumatically controlled vertical movement, are suspended from the left and right sides of the carrier portion. Moveable hook members are suspended from either edge of the left-hand hanging frame for receiving the support ears of a plurality of anodes supplied in sequence by a so-called "constantly pitching" feed conveyor provided upstream of the shaping device.

The anode blanks are advanced along the feed conveyor until the support member contacts triangular pawls which are radially spaced upon the surface of a pair of rotating discs and project therefrom. The blanks are thus lifted upwardly by the pawls, one-by-one, as the discs rotate and are transferred onto the constantly pitching conveyor in a spaced relationship equal to the spacing of the receiving channels of the shaping device. Opposing pairs of hooks are utilized to remove the worked anodes from the shaping device after they have been processed by discharging them onto an endless discharge conveyor located downstream from the shaping device.

An apparatus for removing a cast metal anode from a mold and thereafter transporting it to a quenching bath has been described by J. D. McCain and I. A. Rana in their article entitled, "New Techniques And New Efficiencies At The San Manuel Smelter" published in 1983 by the Metallurgical Society of the American Institute of Metallurgical Engineers as a part of its conference proceedings entitled "Advances In Sulphide Smelting", Vol. 2, Technology & Practice. This reference discloses an automated anode take-off apparatus utilizing a first pair of rotary lift arms to remove an anode from the casting mold, rotate it through an arc of approximately 180° and pass it along to a second pair of "ear twisting" arms which maintains the anode in a preselected position while imparting a twist to the support member of the anode, thus permitting the anode to hang vertically from the second pair of rotating arms. Following rotation of the anode through a second arc of approximately 180° on the second pair of arms, a pair of hydraulic push arms receives the processed anode and subsequently stacks the anodes in a quenching bath for cooling and temporary storage.

Applicant has now invented a fully automated anode take-off system utilizing only one set of rotating arm members which facilitates the removal of a cast metal anode from a mold located on a rotating casting wheel and subsequently transports these anodes to a liquid quenching bath.

SUMMARY OF THE INVENTION

A first embodiment of applicant's rotary take-off system comprises an apparatus for removing manufactured objects from a first work station and transporting them to a second work station. The system comprises a first work station for manufacturing the object, a second work station for further processing the manufactured object, transport means for removing the manufactured objects from the first work station and carrying them through an arc of approximately 180° to a second work station and means located within and connected to the second work station, operatively associated with the transport means, for receiving the manufactured objects from the transport means and positioning these objects within the second work station. The transport means comprises rotatable arm means which are attached to the second work station and drive means for rotating the arm means.

In the system described above, the first work station may comprise, for example, means for casting metal anodes such as a rotatable casting wheel which is provided with a plurality of mold means spaced at predetermined locations along a peripheral circumferential portion thereof. Further, the second work station may comprise quenching means containing a liquid medium for cooling and holding the objects after they are manufactured at the first work station.

The transport means of this embodiment are comprised of a pair of rotatable arm members, configured for rotation about a first shaft member and a second shaft member, respectively, for attachment of the arm members to a first side and a second side, respectively of the second work station. Drive means for rotating the pair of rotatable arm members are also included as a part of the transport means.

The means for receiving and positioning the manufactured objects comprises a pair of pivotably connected push arm members which are configured for receiving the manufactured objects at a first position as they are dropped from the rotatable arm members onto the push arm members and subsequently transporting these objects to a second position within the second work station.

A second embodiment of the present invention comprises a rotary anode take-off system for processing cast metal anodes wherein the system comprises means for casting the metal anodes, quenching means for cooling and storing the cast anodes, transport means for removing the anodes from the casting means and thereafter transporting them to the quenching means through an arc of approximately 180° and means located within the quenching means for receiving finished anodes from the rotatable arm members and subsequently positioning these anodes within the quenching means. The transport means may comprise a pair of rotatable arm members configured for rotation about a first shaft member and a second shaft member, respectively for attachment of the arm members to a first side and a second side, respectively of the quenching means.

In the anode take-off system described above, the casting means may comprise a rotatable casting wheel which is provided with a plurality of anode molds spaced at predetermined locations along a peripheral circumferential portion thereof, wherein the anode is initially cast. In addition, the quenching means comprises bath means containing a sufficient amount of a liquid medium to permit the at least partial immersion therein of the cast anodes subsequent to their removal from the casting means.

Each of the rotatable arm members of the transport means has a first and a second end, the first end being configured for synchronous rotation through an arc of about 360° about a shaft member connecting the arm member to the quenching means and the second end thereof is provided with upper and lower jaw portions. The jaw portions of each of the rotatable arm members are configured so as to accept a supporting ear portion of one of the anodes. Further, each of the lower jaw portions located thereon are provided with pad means to prevent the anodes from slipping out of position as the arm members are rotated.

The drive means utilized to rotate the transport means of this invention comprises motor means for synchronously rotating the pair of arm members; first drive means located on a terminal portion of the first shaft member; second drive means located on a terminal portion of the second shaft member; a third shaft member passing laterally from a first side to a second side of the quenching means through a base portion thereof, the third shaft member being coupled to the motor means and having drive means located on at least one end portion thereof, and connecting means for coupling said first and second shaft member drive means to the drive means of the third shaft member.

The motor utilized may be an electric motor while the drive means may be either sprockets or pulleys and the connecting means may be either chain means or belt means, respectively.

The means for receiving and positioning the anodes which drop thereupon from the transport means in the present embodiment comprises a pair of pivotably connected push arm members which are located in and connected to the quenching means and are operatively associated with the pair of rotatable arm members. These push arm members are configured for receiving the anodes at a first position as they are dropped from said rotatable arm means and subsequently transporting these anodes to a second position within the quenching means.

Each of the push-arm members may further comprise a transverse cross member attached thereto at an upper, unconnected end for supporting an ear portion of one of the anodes which facilitates the sliding and stacking of the finished anodes within the quenching means.

A further embodiment of the present invention may comprise an improved rotary anode take-off system for removing cast metal anodes from a plurality of anode molds located along a peripheral circumferential portion of a rotatable casting wheel, the anodes having been initially cast into a rectangular plate having supporting ear portions which protrude outwardly in a perpendicular direction from opposite side edges located at an upper end thereof, and subsequently transporting these cast anodes through an arc of about 180° to bath means.

The improvement comprises transport means configured for supporting the ear portions of the anodes to facilitate the transportation thereof to the bath means. This transport means comprises a pair of synchronously rotatable arm members capable of rotation through an arc of about 360°. Each of the arm members has a first end and a second end, the first end being adapted for rotation about a shaft member for attaching the arm member to a side portion of the bath means. The second end of each of these arm members is provided with upper jaw and lower jaw portions, which are configured for accepting one of the ear portions of the anode and thereby supporting the anode through an arc of about 180° as it is transported between the mold and the bath means. Additionally, the lower jaw portion of each arm member is provided with pad means for positioning thereon the ear portion of the anode.

The improvement further comprises drive means coupled for rotation to at least one of the pair of arm members and a pair of hydraulically operated push-arm members. Each of these push arm members is located within the bath means and has a first end pivotably connected to one of the sides thereof and a second end to which is attached a transverse cross member for facilitating the sliding and stacking of the anodes within the bath means.

An alternate embodiment of the rotary anode take-off system of the invention comprises a rotatable casting wheel which is provided with a plurality of anode molds spaced at predetermined locations along a peripheral circumferential portion thereof; bath means containing a sufficient amount of a liquid medium to permit the at least partial immersion therein of the anodes subsequent to their removal from the anode molds, transport means and a pair of hydraulically operated push arm members operatively associated with rotating arm members of the transport means. Each of the push arm members is located within the bath means and has a first end pivotably connected to one of the sides thereof and a second end to which is attached a transverse cross member for facilitating the sliding and stacking of the anodes within the bath means in a manner such that the supporting ears of the anodes are supported upon the side portions of the bath means.

The transport means of this embodiment comprises a pair of synchronously rotatable arm members capable of rotation through an arc of about 360°. Each of the arm members has a first end and a second end, the first end being adapted for rotation about a shaft member for attaching the arm to a side portion of the bath means. The second end of each of said arm member is provided with an upper jaw portion and a lower jaw portion. Each of these arm members are therefore configured for accepting one of the ear portions of the anode and thereby supporting the anode through an arc of about 180° as it is transported between the mold and the bath means. The lower jaw portion is additionally provided with pad means for positioning thereon one of the ear portions of the anode.

The transport means further comprises drive means which are coupled to at least one of the pair of arm members for synchronous rotation thereof. These drive means comprise motor means for synchronously rotating the pair of arm members; first drive means located on a terminal portion of the first shaft member; second drive means located on a terminal portion of a second shaft member; a third shaft member passing laterally from a first side to a second side of the quenching means through a base portion thereof. The third shaft member is coupled to the motor means and has drive means located at each end portion thereof. The first and second shaft member drive means are coupled to the drive means of the third shaft member with the use of connecting means.

Applicant has also invented a method for removing manufactured objects from a first work station and transporting these objects to a second work station. The method comprises positioning the first work station such that one of the manufactured objects is at a location accessible to applicant's rotary take off system; rotating the transport means of the system through an arc of about 90° from a first position to a second position so as to place the transport system in contact with the manufactured object; engaging a peripheral portion of the manufactured object with the transport means so as to remove the manufactured object from a first work station; rotating the transport means to a third position corresponding to the second work station through an arc of about 180° and thereby transporting the manufactured object to a second work station; and rotating the transport means back to an original first position through an arc of about 90° so as to permit the removal and transport cycle to be repeated.

An alternate embodiment of the present method includes a method for removing and transporting metal anodes from casting means to quenching means. The method comprises rotating the casting means so as to spot one of the metal anodes into a position where it is accessible to the transport means of applicant's rotary anode takeoff system; rotating the pair of rotatable arm members from a first vertical position to a second position proximate to and on a level with the casting means; engaging one of the supporting ears of one of the anodes between the jaw portions of each of the rotatable arm members to facilitate the removal of the anode from the casting means; rotating the pair of rotatable arm members to a third position corresponding to the quenching means thereby transporting the anode to the quenching means; and rotating the pair of rotatable arm members back to an original first position to permit the removal and transport of additional anodes.

The method may further comprise transferring the anode from the pair of rotatable arm members to a pair of hydraulically operated push-arm members operatively associated with the rotatable arm members; pushing the anodes to a rear portion of said bath means and restacking the anodes therein in such a manner that the ear portions thereof are supported upon side portions of the bath means.

Applicant has thus invented an improved apparatus and method for removing anodes preferably comprised of cast copper metal, but which may also be fabricated from such additional materials as, for example, nickel and lead, from an anode casting wheel. Applicant's system has the advantage of being automated, thus replacing the prior manually controlled systems. The system described herein is safer for operating personnel and which greatly reduces the cost of maintenance, air and water. Very little maintenance is required and much less space is necessary for the installation and operation of this system.

DETAILED DESCRIPTION OF THE PREFERRED EMBODIMENTS

Figure 1:
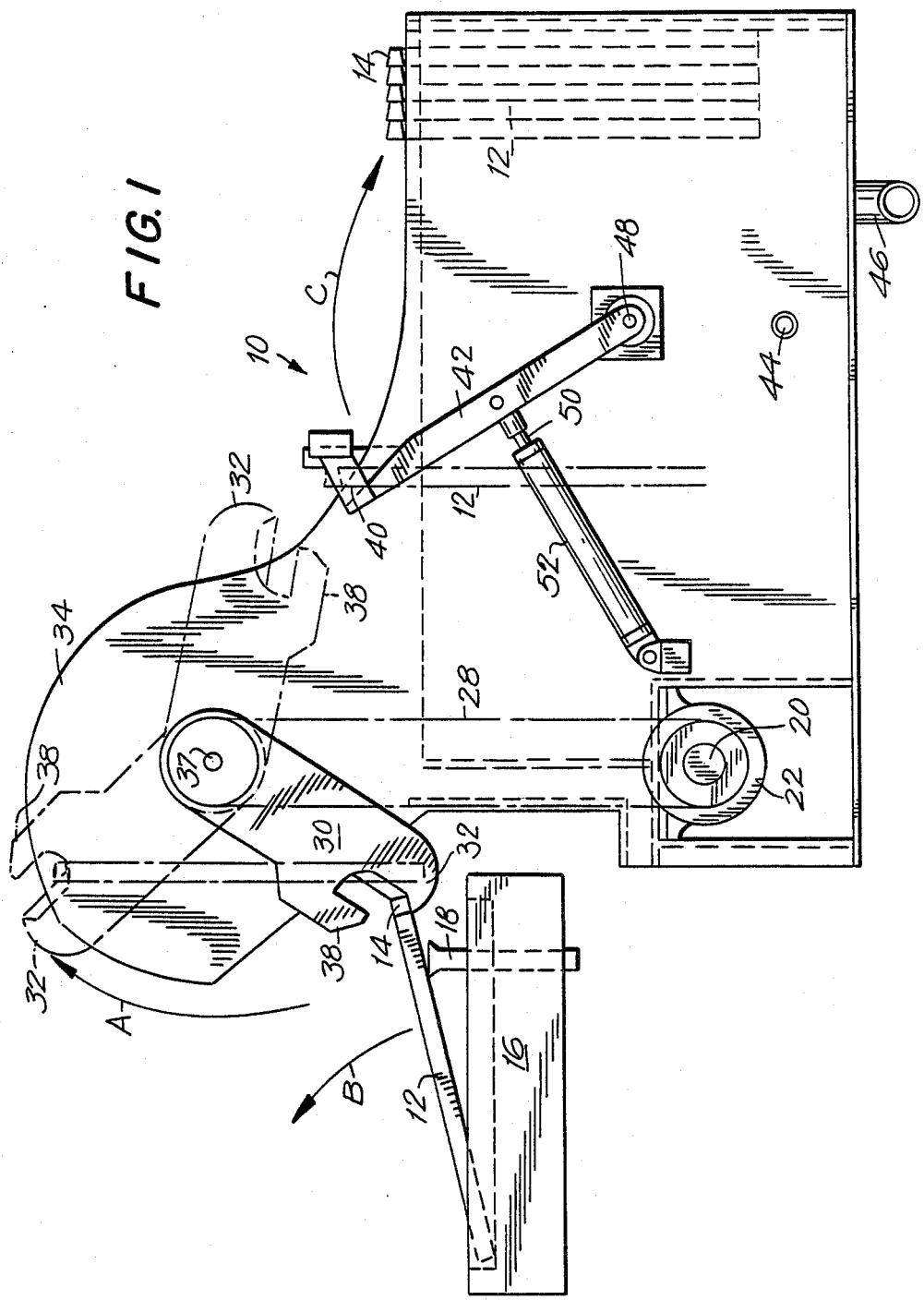
FIG. 1 is a side sectional view of a side elevation of applicant's rotary take-off system.

Referring initially to FIG. 1 there is illustrated rotary anode take-off system 10 for removing cast anodes 12 or other manufactured products from a first work station such as mold 16 located on, for example, a rotary casting wheel (not shown). In operation, the first work station or casting, wheel is rotated to a position that spots one mold 16 directly in front of take-off system 10. At that location, lift pin 18, or other suitable means, elevates anode 12 from mold 16.

When anode 12 attains its maximum height above mold 16, the system's hydraulic drive assembly is activated. This assembly comprises motor 20 mounted on a transfer case which is attached to drive shaft 26 by coupling 24. By "transfer case", applicant means a system, such as a gear box or a torque hub, for transmitting the power generated by motor 20 to shaft 26. The preferred apparatus utilized in the present invention is a torque hub 22, but other means known to those skilled in the art may also be substituted.

The assembly is activated in order to turn a pair of rotatable arm members 30, comprising a portion of the transport means of system 10, through an arc of approximately 90° from a first vertical resting position. Rotatable arm members 30 are connected to the hydraulic drive assembly by drive means comprising preferably, sprockets and chains 28 or, for example, pulleys and belts. These drive means may be mounted for either a left hand or right hand drive or the apparatus may be driven from both sides at once.

As each arm member 30 begins to rotate from its first position in the direction of arrow A, a lower jaw portion 32 thereof catches underneath an "ear" portion 14 of anode 12 at a second position, thus pulling anode 12 out of mold 16 in the direction of arrow B. The lower jaw portion 32 of arm member 30 may be provided with pads (not shown) to retain anode 12 in place and to prevent it from sliding out of position.

The rotatable arm members 30 are each attached to a side plate 34 of a quenching medium 36, or any other suitable second work station which will permit the further processing of these manufactured objects, by shaft members 37 having connecting means such as sprockets or pulleys located on a portion thereof. These connecting means are coupled by chains or belts, respectively, to drive means 28 located on drive shaft 26.

As rotating arms 30 continue to rotate in a clockwise direction, which may be adjusted to counterclockwise if necessary, anode 12 is elevated up and onto side plates 34 of quenching medium 36. Ear portions 14 of anode 12 extend at this point past the outside of side plates 34 while the body of anode 12 continues to a point past center, i.e., to the one o'clock position, where the anode slides forward and comes in contact with the upper jaw portion 38 of each rotating arm 30.

Upper jaw portion 38 then serves as a lower jaw as rotating arms 30 descend toward a third position where anode 12 can no longer be supported. In effect, therefore, anode 12 is carried through an arc of approximately 180° as it travels from its second position, wherein ear portion 14 is first engaged, to its third position where anode 12 can no longer be supported by arm member 30.

Upon reaching this third position, anode 12 then slides forward and stops against the longitudinal cross members 40 of pivotally connected push arm members 42. This stop against push arms 42 helps to reduce the splashing effect as anode 12 contacts the liquid medium, which is preferably water, located within quenching medium 36. The liquid may be added to quenching means 36, which is preferably a water bath, through inlet 44 and it may be removed through drain 46 to facilitate the removal of anodes 12 from quenching medium 36 or when cleaning or repair of the bath 36 becomes necessary.

Each push arm 42 is pivotally connected to a side portion of quenching means 36 by a shaft 48. The push arms 42 are preferably hydraulically controlled by cylinder rods 50 which are enclosed in hydraulic cylinders 52. When anode 12 contacts push arms 42, this stop serves to synchronize push arms 42 when the cylinders 52 are extended.

Once anode 12 slides forward off of rotating arm 30 to push arms 42 at the third position so that ear portions 14 are resting thereon, arms 30 continue to rotate in a clockwise direction through a further arc of about 90° to their original starting position. At this point, cylinders 52 are hydraulically activated and rods 50 are extended outwardly which, in turn moves push arms 42 forward in the direction of arrow C, thus sliding and stacking anodes 12 to the rear of quenching medium 36. Anodes 12 may then be removed by a fork-lift or other convenient means. To facilitate the stacking and removal of anodes 12 from quenching medium 36, each of the ear portions 14 of anode 12 is oriented so as to rest upon one of the sides of quenching medium 36.

Figure 2:
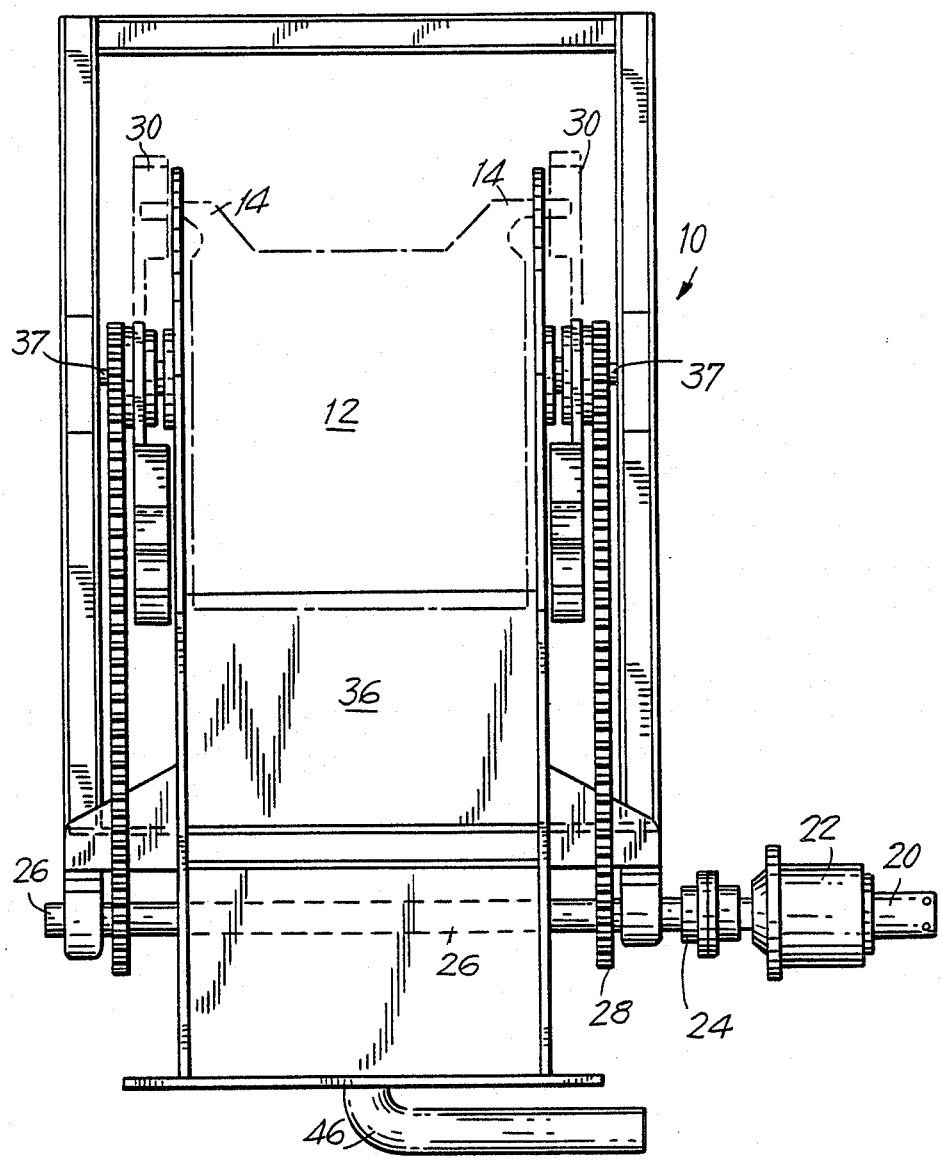
FIG. 2 is a section of an end elevational view of applicant's rotary take-off system.

Turning now to FIG. 2, features therein which are identical to those found in FIG. 1 have therefore been identified with the same number. As noted above, FIG. 2 is a section of an end elevation view of applicant's rotary take-off system.

This view clearly illustrates the manner in which the system's hydraulic drive assembly is coupled to the rotatable arm member 30 of system 10. Motor 20, which is preferably a hydraulic motor, but which may also be powered by for example, electricity or some hydrocarbon-based fuel such as gasoline, is mounted on torque hub 22 which is attached to drive shaft 26 by coupling 24. Drive shaft 26 is provided with drive means such as, preferably sprockets, or pulleys (not shown) on each terminal portion thereof. These drive means are connected to complimentary drive means located on a terminal portion of each of shaft members 37 for attaching each of the rotatable arm members 30 to drive shaft 26. The preferred drive means are sprockets which may be connected by chains but a combination of belts and pulleys may also be used for the same purpose.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

I claim:

1. A rotary anode take-off system for processing cast metal anodes, said system comprising:
    (a) means for casting said metal anodes;
    (b) quenching means for cooling and storing said cast anodes;
    (c) transport means for removing said anodes from said casting means and thereafter transporting said anodes directly to said quenching means through a single arc of approximately 180°, said transport means consisting essentially of
        (i) a pair of rotatable arm members, said members being configured for rotation about a first shaft member and a second shaft member respectively for attachment of said arm members to a first side and a second side respectively of said quenching means;
        (ii) drive means coupled with at least one of said arm members for the synchronous rotation of said arm members; and
    (d) means located within said quenching means for receiving said anodes from said rotatable arm members and subsequently positioning said anodes within said quenching means.

2. The rotary anode take-off system of claim 1 wherein said casting means comprises a rotatable casting wheel provided with a plurality of anode molds spaced at predetermined locations along a peripheral circumferential portion thereof.

3. The rotary anode take-off system of claim 1 wherein said quenching means comprises bath means containing a sufficient amount of a liquid medium to permit the at least partial immersion therein of said anodes subsequent to their removal from said casting means.

4. The rotary anode take-off system of claim 1 wherein each of said rotatable arm members has a first end and a second end, said first end being configured for rotation about one of said shaft members and said second end being provided with upper and lower jaw portions.

5. The rotary anode take-off system of claim 4 wherein said upper and lower jaw portions of each of said rotatable arm members are configured so as to accept a supporting ear portion of one of said anodes.

6. The rotary anode take-off system of claim 5 wherein said lower jaw portions of each of said rotatable arm members are provided with pad means to prevent said anodes from slipping out of position as said arm members are rotated.

7. The rotary anode take-off system of claim 1 wherein said pair of rotatable arm members are capable of synchronous rotation through an arc of about 360°.

8. The rotary anode take-off system of claim 1 wherein said drive means comprises:
    (a) motor means for synchronously rotating said pair of arm members;
    (b) first drive means located on a terminal portion of said first shaft member;
    (c) second drive means located on a terminal portion of a second shaft member;
    (d) a third shaft member passing laterally from a first side to a second side of said quenching means through a base portion thereof, said third shaft member being coupled to said motor means and having drive means located on at least one end portion thereof; and (e) connecting means for coupling said first and said second shaft member drive means to said drive means on said third shaft member.

9. The rotary anode take-off system of claim 8 wherein said motor is a hydraulic motor, said drive means are sprockets and said connecting means are chain means.

10. The rotary anode take-off system of claim 8 wherein said motor is a hydraulic motor, said drive means are pulleys and said connecting means are belt means.

11. The rotary anode take-off system of claim 1 wherein means for receiving and positioning said anodes comprises
a pair of pivotably connected push-arm members located within and connected to said quenching means, operatively associated with said pair of rotatable arm members and configured for receiving said anodes at a first position as they are dropped from said rotatable arm means and subsequently moving said anodes to a second position within said quenching means.

12. The rotary anode take-off system of claim 11 wherein each of said push arm members further comprises a transverse cross member attached thereto at an upper unconnected end thereof for supporting an ear portion of one of said anodes and facilitating sliding and stacking of said finished anodes within said quenching means.

13. An improved rotary anode take-off system for removing cast metal anodes from a plurality of anode molds located along a peripheral circumferential portion of a rotatable casting wheel, each of said anodes having initially been cast into the form of a rectangular plate having supporting ear portions which protrude outwardly in a perpendicular direction from opposite side edges located at an upper portion thereof, and subsequently transporting said cast anodes from said anode mold through an arc of about 180° to bath means, said improvement comprising:
 (a) transport means configured for supporting said ear portions of said anodes to facilitate the transportion of said anodes between said mold and said bath means thereof, said transport means consisting essentially of
   (i) a pair of synchronously rotatable arm members capable of rotation through an arc of about 360°, each of said arm members having a first end being adapted for rotation about a shaft member for attaching said arm to a side portion of said bath means and said second end being provided with an upper jaw portion and a lower jaw portion, said jaw portions of each of said arm members configured for accepting one of said ear portions of said anode and thereby supporting said anode through a single arc of about 180° as it is transported directly between said mold and said bath means, said lower jaw portion being provided with pad means for positioning thereon said one of said ear portions of said anode;
   (ii) drive means coupled to at least one of said pair of arm members for synchronously rotating said arm members; and
 (b) a pair of hydraulically operated push arm me operatively associated with said rotating arm members, each of said push arm members located within said bath means and having a first end pivotably connected to one of said sides thereof and a second end to which is attached a transverse cross member for facilitating the sliding and stacking of said anodes within said bath means.

14. A rotary anode take-off system comprising:
(a) a rotatable casting wheel provided with a plurality of anode molds spaced at predetermined locations along a peripheral circumferential portion thereof;
(b) bath means containing a sufficient amount of a liquid medium to permit the at least partial immersion therein of said anodes subsequent to their removal from said anode molds;
(c) transport means consisting essentially of
  (i) a pair of synchronously rotatable arm members capable of rotation through an arc of about 360°, each of said arm members having a first end and a second end, said first end being adapted for rotation about a shaft member for attaching said arm to a side portion of said bath means and said second end being provided with an upper jaw portion and a lower jaw portion, said jaw portions of each of said arm members configured for accepting one of said ear portions of said anode and thereby supporting said anode through a single arc of about 180° as it is transported directly between said mold and said bath means, said lower jaw portion being provided with pad means for positioning thereon said one of said ear portions of said anode;
  (ii) drive means comprising
    (1) motor means for synchronously rotating said pair of arm members;
    (2) first drive means located on a terminal portion of the first shaft member for attaching a first one of said arm members;
    (3) second drive means located on a terminal portion of the second shaft member for attaching a second one of said arm members;
    (4) a third shaft member passing laterally from a first side to a second side of said quenching means through a base portion thereof, said third shaft member being coupled to said motor means and having drive means located on at least one end portion thereof; and
    (5) connecting means for coupling said first and said second shaft member drive means to said drive means of said third shaft member; and
(d) a pair of hydraulically operated push arm members operatively associated with said rotating arm members, each of said push arm members located within said bath means and having a first end pivotably connected to one of said sides thereof and a second end to which is attached a transverse cross member for facilitating the sliding and stacking of said anodes within said bath means in a manner such that each of 15. A method for removing and transporting metal anodes from casting means to quenching means, said method comprising;
rotating said casting means so as to spot one of said metal anodes into a position wherein it is accessible to the transport means of the rotary anode take-off system of claim 8 or 14;
rotating said pair of rotatable arm members from a first vertical position to a second position proximate to and on a level with said casting means;
engaging one of said supporting ears of one of said anodes between the jaw portions of each of said rotatable arm members to facilitate the removal of said anode from said casting means;

rotating said pair of rotatable arm members through a single arc of about 180° to a third position corresponding to said means, thereby transporting said anode directly to said quenching means; and rotating said pair of rotatable arm members back to original first position to permit the removal and transport of additional anodes.

16. The method of claim 15 which further comprises:

transferring said anode from said pair of rotatable arm members to a pair of hydraulically operated push arm members located within said quenching means and operatively associated with said rotatable arm members;

pushing said anodes to a rear portion of said bath means; and stacking said anodes therein in such a manner that said ear portions thereof are supported upon side portions of said bath means.

17. The method of claim 15 wherein said arm members of said transport means are rotated by operating said drive means of said system.

18. The method of claim 15 which further comprises initially casting said metal anodes in a mold located upon a rotatable casting wheel prior to the removal and transport of said anode from said mold.

19. The method of claim 15 wherein said pair of arm members is rotated through an arc of about 90° from a first vertical position to permit their engagement with said supporting ear on one of said anodes.

20. The method of claim 15 wherein said pair of arm members is rotated through a single arc of about 180° to transport each of said anodes directly from said casting means to said quenching means.

21. The method of claim 15 wherein said pair of arm member a is rotated through an arc of about 90° so as to return said arm members to an original first position.

* * * * *